US005620019A

United States Patent [19]

Nicolaisen

[11] Patent Number: 5,620,019

[45] Date of Patent: Apr. 15, 1997

[54] OPERATING DEVICE

[75] Inventor: Holger Nicolaisen, Nordborg, Denmark

[73] Assignee: Danfoss A/S, Nordborg, Denmark

[21] Appl. No.: 256,304

[22] PCT Filed: Jan. 21, 1993

[86] PCT No.: PCT/DK93/00019

§ 371 Date: Jun. 29, 1994

§ 102(e) Date: Jun. 29, 1994

[87] PCT Pub. No.: WO93/15326

PCT Pub. Date: Aug. 5, 1993

[30] Foreign Application Priority Data

Jan. 22, 1992 [DE] Germany .......................... 42 01 570.7

[51] Int. Cl.[6] ............................. F16K 31/02; F16K 51/00

[52] U.S. Cl. ...................... 137/315; 251/129.15; 411/549

[58] Field of Search ........................... 251/30.03, 129.15; 137/315; 411/552, 553, 549

[56] References Cited

U.S. PATENT DOCUMENTS

| | | | |
|---|---|---|---|
| 2,100,816 | 11/1937 | Purnton | 411/549 |
| 2,374,679 | 5/1945 | Hallock | 411/551 |
| 3,917,218 | 11/1975 | Marocco | 251/30.03 |
| 4,842,010 | 6/1989 | Edgecomb et al. | 251/129.15 X |
| 5,102,096 | 4/1992 | Siegel et al. | 257/129.15 |

*Primary Examiner*—John Rivell
*Attorney, Agent, or Firm*—Lee, Mann, Smith, McWilliams, Sweeney & Ohlson

[57] ABSTRACT

An operating device (1) with a top part (2) having an actuating arrangement (5) and a bottom part (3) carrying the top part (2). The top part (2) and bottom part (3) are releasably joined to one another and the actuating arrangement (5) drives a control member (6). In an operating device of this kind it is desirable for the top part (2) to be easily mounted on the bottom part (3) and to be easily detachable therefrom. For that purpose the top part (2) and the bottom part (3) are joined to one another by a bayonet joint (16,18).

16 Claims, 2 Drawing Sheets

Figure 1:
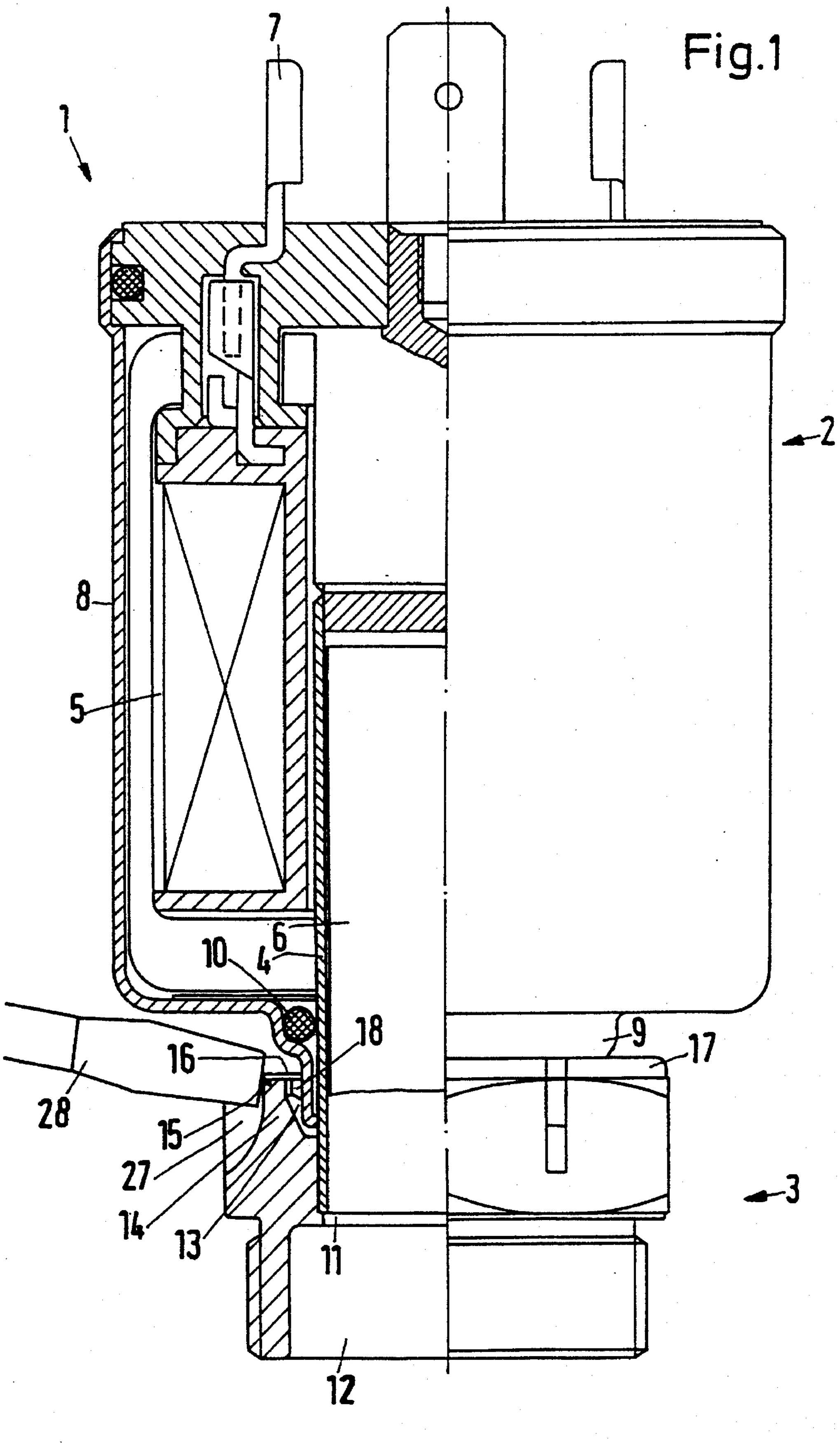

1
2
3
4
5
6
7
8
9
10
11
12
13
14
15
16
17
18
27
28

OPERATING DEVICE

The invention relates to an operating device with a top part having an actuating arrangement for driving a control member, and a bottom part carrying the top part, wherein the top part and the bottom part are releasably connected with one another by means of a bayonet lock wherein essentially radial projections on one of the parts are held in the other part, the connection being effected by inserting the projections into recesses in the other part and turning the two parts in relation to each other.

Such an operating device is known from DE 40 13 875 A1. This publication relates to an electromagnetic valve, in the top part of which there is provided an armature and an energizing coil and in the bottom part of which there is provided a valve seat and corresponding inlet and outlets.

The top part and the bottom part are joined together by a bayonet joint. In the one part there is provided an oval opening for inserting of the other part, said opening having at two 180° displaced places an undercut recess (26) which extends radially each over 90°. The other part having radial side extensions (16) corresponding to the diameter of the free part (29) of the oval opening. By turning the one part (the upper part) 90° the radial extension moves into the undercut recess (25). This joint is expensive, the half of the magnetic acutator part (10) is picked up by the valve housing (22), and the magnetic actuator is not locked in the mounted position, and may due to e.g. vibrations loosen after some time. Therefore it is necessary to lock the magnetic actuator by means of a wall part (33) of a not shown cover, picking up the electric connector pins DE 36 09 366 C2 shows a corresponding bayonet joint in which knob-like extensions (10,13) provides for catch-in locking of the parts. Such a locking is not reliable.

An operating device is further known, for example, from EP 0 151 563 A2. That publication relates to an electromagnetic valve, in the top part of which there is provided an armature and an energizing coil and in the bottom part of which there is provided a valve seat and corresponding inlet and outlets. The top part and the bottom part are screwed together, that is to say, the top part has a foot with an external thread which is screwed into an internal thread in a bore in the bottom part. In order to join the top part and the bottom part together, it is necessary to rotate the top part several times relative to the bottom part. This can lead to difficulties if the upper part has already been electrically wired up, that is to say, its electrical connections have already been connected to cables.

Another operating device, which is also in the form of an electromagnetic valve, is known from EP 0 428 728 A1. Here, the top part and bottom part are joined to one another by screw bolts, which are guided through the top part and are screwed into the bottom part. Several bolts have to be provided in the circumferential direction in order to ensure that the top part and the bottom part are evenly clamped. This operating device is therefore not very easy to assemble.

Another operating device in the form of an electromagnetic valve is known from DE 32 19 799 A1, in which the magnetic system is mounted in an insulation sleeve also surrounding the armature and an armature tube. The insulating sleeve carries a mounting foot. At one end this has a snap-fit device, by means of which the magnetic system can be locked in a housing. The snap-fit device has locking projections which may optionally be forcibly deformed under heat in order to fix the magnetic system permanently in the housing. The reliability of an operating device of that kind is suspect if it is to be operated over a relatively long period of time with a large number of operating cycles, because the snap-fit connection can become loose through fatigue or the plastics material forcibly deformed under heat may break.

The invention is therefore based on the problem of providing an operating device in which in a simple manner the top part and the bottom part can be joined rapidly with one another, and by which at the same time a safe mutual locking of the parts may be achieved.

This problem is solved in that the said radial projections are essentially pimple-like projections, that the recesses are formed in a resilient locking ring held in the other part, and that the projections slide in beneath the locking ring when the two parts are turned.

By use of such a bayonet joint the top part and the bottom part therefore merely require to be pushed together. After a short rotation they are joined quickly and reliably to one another. They can be detached from one another again just as quickly. There is no need for several rotations, as required in a screw connection. There is also no need for a plurality of bolts to be pushed through the housing and screwed up. A bayonet connection can be constructed from materials that are largely fatigue-proof, so that even over a relatively long period of time and/or with a large number of operating cycles of the operating device, the reliability of the connection remains guaranteed. If just one part of the operating device is defective, this part can be quickly exchanged without laborious dismantling of the operating device being necessary.

By using a locking ring as claimed this exerts a resilient force on the radial projections so that the two parts, top part and bottom part, are held fixedly in a distinct axial position relative to one another. By a simple rotation in the opposite direction the top part can be separated from the bottom part. The rotary movement can be performed relatively easily because unlike by the DE 36 09 366 C2 the radial projections are unable to become jammed beneath the locking ring by virtue of the resilient properties of the locking ring.

Preferably, the locking ring is held in its part by a flanged edge. A flanged edge is easy to produce. It holds the locking ring reliably in the axial direction, that is to say, in the direction in which the top part and bottom part are removed from one another. Because this is also the direction in which the forces that are effective on operation of the operating device are at their strongest, the flanged edge guarantees that the top part and bottom part are reliably held together. When the locking ring is mounted fixedly by a flange in its part or secured in some other way against rotation, assembly and dismantling of the operating device, that is to say, putting together the top part and bottom part, can be carried out without tools.

Advantageously, the locking ring is supported by an annular face on the side opposing the flanged edge. Even if the top part and the bottom part are put together incorrectly, so that the radial projections press on the locking ring, no appreciable deformation of the locking ring can occur. The functional efficiency of the bayonet joint is therefore maintained.

In an especially preferred embodiment, the locking ring is not fixedly mounted by a flange, but is mounted so that it is rotatable at least in one direction. It then has an externally accessible turning-moment engagement face. This embodiment is desirable for reasons of security, since the top part is then unable to be removed easily from the bottom part. On the contrary, a tool is required for that purpose. The tool can, however, be of very simple construction with this embodiment. It must merely be capable of acting on the locking ring via the turning-moment engagement face in the locking ring and preventing rotation of the locking ring. When the locking ring is rotatable in both directions, the tool acting on the turning-moment engagement face is required both for assembly and for dismantling. When rotation is possible in only one direction, assembly, that is to say, putting together the top part and bottom part, can generally be effected without tools, whereas dismantling does require a tool.

For that purpose, in an especially preferred embodiment provision is made for the locking ring to have at least one radial opening and for the part carrying it to have at least one externally accessible slot with which the opening can be caused to coincide. The radial opening then acts as turning-moment engagement face. A simple pin or similar means, for instance a screwdriver, can be used as the tool that is introduced through the slot. When it is in engagement with the recess, it impedes further rotation of the locking ring, without relatively large forces having to be exerted from the outside.

It is then preferable for the slot to interrupt the flanged edge and/or the annular face. The slot is then sufficiently long in the axial direction for the blade of a screwdriver to be used without problems. Even without an accurate placement of the tool, the locking ring is securely gripped and prevented from rotating.

Advantageously, several openings and several slots are provided, the number of openings and the number of slots having no common divisor greater than 1. For example, two slots and three openings can be provided. A relatively small rotation of the locking ring is then all that is required until, with the positions of a slot and an opening coinciding, a suitable tool can be introduced in order to prevent the locking ring from rotating further.

Preferably, the locking ring has a resilient tongue which, on rotational movement of the locking ring in one direction wedges against the part carrying the locking ring and on rotational movement in the other direction slides along the part. By means of such a non-return blocking device, rotational movement in one direction can be effected without difficulty, whilst in the other direction it is largely prevented, the resilient tongue automatically causing the rotational movement of the locking ring to be blocked without external assistance.

In a preferred embodiment, the tongue can be formed very simply by a cut in the locking ring extending in the circumferential direction, at one end of which there adjoins a radial cut, the region circumscribed by the cuts being bent out of the plane of the locking ring. The term "cut" is not intended to restrict the manufacture of the locking ring to a cutting in the literal sense. The cuts can also be produced by stamping or other separating processes. The cuts may also be quite wide, in particular the radial cut, which can then be used also as a radial opening.

Advantageously, the recesses in the locking ring are substantially rectangular in shape, corners that form the transition from the recesses to the circumferential edge being bent in opposite directions out of the plane of the locking ring. By this means, after insertion in the recesses and on rotation in one direction the radial projections are able to slide without difficulty beneath the locking ring, without appreciable additional axial pressure being necessary. On the other hand, however, rotational movement is blocked before the radial projections are able to escape from beneath the closure[1] at the next recess. It should be noted at this juncture that the radial projections can project outwards instead of inwards. When they project inwards, the recesses of the locking ring must lie on the radially outer edge. When they project outwards the recesses lie correspondingly on the inner side of the locking ring.

[1] "Verschluss" (closure) presumably in error for "Verschlussring" (locking ring)—translator.

It is also preferable for the locking ring to have formations projecting into the path of the radial projections, or arranged next to it. When the top part and bottom part are rotated relative to one another for connecting purposes, a stop is reached or a click is heard which indicates that the top part has reached a locking position that is sufficiently tight in relation to the bottom part.

Advantageously, the part bearing the radial projections comprises a beaker-like housing which continues in a sleeve-like foot of circular cross-section that carries the radial projections, the housing and the foot being of integral construction and being made, in particular, of metal. A suitable metal is, for example, stainless steel, which also has a good visual appearance. A construction of that kind ensures that the parts accommodated inside the housing also have a defined position in relation to the other parts of the operating device.

Preferably, the operating device is in the form of an electromagnetic valve with an armature that is movable in the top part, which armature projects into the bottom part. By this means a good guidance is achieved when mounting the top part.

It is also preferable for the armature to be mounted in an armature tube which is fixed in the foot and projects into the bottom part. By this means it is possible to achieve not only a good guidance, but also a good seal, in that, for example, an O-ring seal is provided between the housing and the armature tube so that the magnetic system is hermetically sealed in relation to liquid-carrying parts that the electromagnetic valve is to control.

Figure 2:
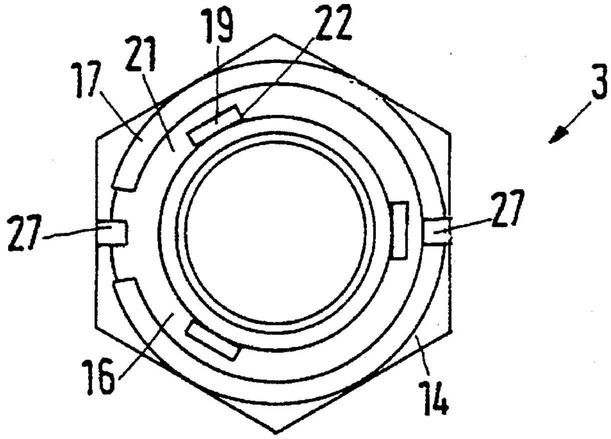
Figure 3:
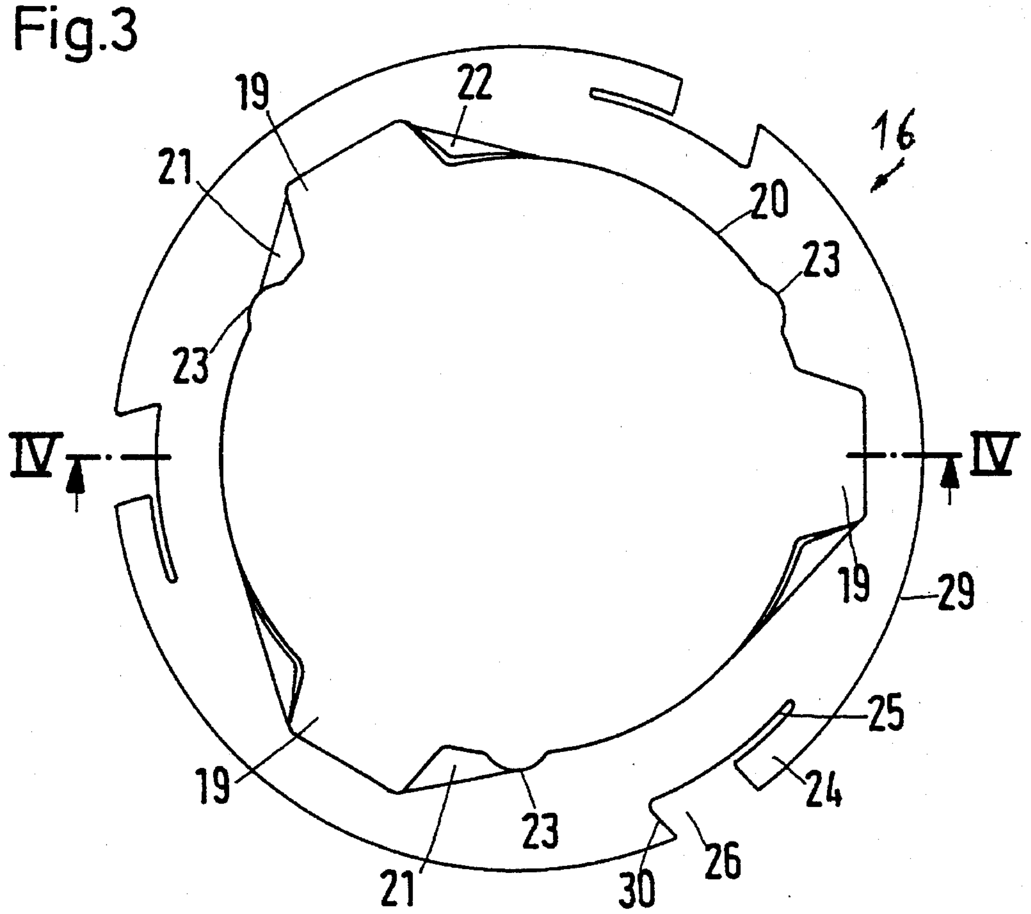
Figure 4:
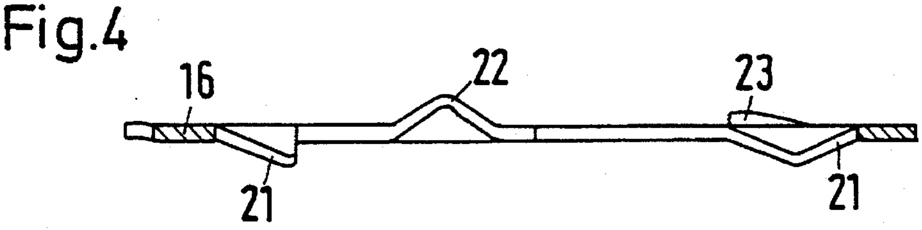

The invention is described hereinafter with reference to a preferred embodiment and in conjunction with the drawing, in which FIG. 1 shows a side view of an operating device, partially in section, FIG. 2 shows a plan view of a bottom part, FIG. 3 shows a plan view of a locking ring and FIG. 4 shows a sectional view along the line IV—IV shown in FIG. 3.

An operating device illustrated in FIG. 1 is in the form of an electromagnetic valve 1 with a top part 2 and a bottom part 3. In the top part 2 an armature 6 is arranged so as to be axially movable in an armature tube 4, which extends into a coil arrangement 5. When the coil arrangement 5 is supplied with current by way of electrical connections 7, the armature 6 is axially displaced. The top part 2 is surrounded by a housing 8 which consists of metal, preferably stainless steel, and at its underside continues in the form of a foot 9. The directional details "top" and "bottom" are not to be understood as constraints on the orientation of the electromagnetic valve in space. On the contrary, "top" is the end, or the direction towards the end, at which the top part 2 is arranged. "Bottom" is the end, or the direction towards the end, at which the bottom part 3 is arranged. The housing 8 and the foot 9 are of integral construction. The foot 9 surrounds the armature tube 4 closely. Between the housing 8 and the armature tube 4 there is arranged an O-ring seal 10, so that the coil arrangement 5 and its associated electrical connections are protected against ingress of a fluid along the armature tube 4. A valve seat 11, not illustrated in any detail, which is arranged to be closed by the underside of the armature 6, is provided in the bottom part 3. The armature is therefore able to interrupt a flow path from an inlet 12 to an outlet, not illustrated in further detail.

The bottom part 3 has a circular ring-shaped aperture 13 matching the diameter of the likewise approximately circular ring-shaped foot 9; the foot 9 is arranged to be inserted into the aperture 13. The aperture 13 is bounded by a wall 14. In the upper region of the wall 14 there is a step which forms an annular face 15 which lies in a plane to which the axial direction of the armature is perpendicular. On the annular face 15 there is a resilient locking ring 16. The upper edge of the wall 14 projecting above the annular face 15 is flanged inwards, and therefore has a flanged edge 17 which holds the locking ring 16 on the annular face 15. The holding function is restricted here to the axial direction. The locking ring 16 is still mounted on the annular face 15 so as to be rotatable in the circumferential direction.

The foot 9 of the top part 3 has radial projections 18 which can be introduced into recesses 19 (FIGS. 2 and 3) in the locking ring 16. The radial extent of the radial projections 18 is therefore smaller than, or at most the same size as, the radial extent of the recesses 19. The recesses 19 are of substantially rectangular construction; "rectangular" is to be interpreted broadly and also includes trapezoidal shapes.

At the transition between the recesses 19 and the inner edge 20 of the substantially circular ring-shaped locking ring 16, corners 21, 22 are provided, the corner 22 located clockwise of the recess 19 being bent upwards out of the plane of the locking ring 16 and the other corner 21 being bent downwards out of the plane of the locking ring 16. When the top part 2 is now inserted with its foot 9 in the bottom part 3 so that the radial projections 18 are introduced into the recesses 19, the top part 2 can be connected to the bottom part 3 simply by being rotated. The radial projections 18 slide beneath the corners 22 and then further beneath the locking ring 16. Because of the resilient properties of the locking ring 16 the top part 2 is then held securely in the bottom part 3 by means of the radial projections 18.

The radial projections 18 do not need to have a large spatial dimension. They can be essentially in the form of pimples. It is sufficient if their dimension in a radial and a circumferential direction is large enough for them to be able to absorb in the axial direction the forces acting on the top part 2.

The downwardly bent corners 21 limit the rotational movement of the top part 2 relative to the bottom part 3. The radial projections 18 are unable to get past the downwardly bent corners 21 in order to emerge from the next recess 19 again. In addition, formations 23 which lie in the path of movement of the radial projections 18 or are adjacent to it can be provided in the locking ring 16. The path of movement of the radial projections 18 is the path that the radial projections 18 describe when the top part 2 is turned. The formations 23 may project upwards out of the plane of the spring ring 16. In this case, the radial projections 18 are able to lock into the formations 23. Alternatively, however, they can project downwards out of the plane of the spring ring 16. In that case, the radial projections 18 bear against the formations 23. Rotational movement is restricted in both cases. If desired, a click may indicate that the end position has been reached.

As mentioned above, the locking ring 16 is rotatably mounted in the bottom part 3. In order to block rotation in one direction, tongues 24 which are bent downwards out of the plane of the locking ring 16 are provided. The tongues are formed by a cut 25, which extends in the circumferential direction, and a radial cut 26 adjoining one end of this cut 25. The "cuts" 25, 26 can of course, also be formed by stamping or other separating processes. On rotation of the locking ring 16 the tongues 24 slide on the annular face 15 when the locking ring 16 is turned anti-clockwise. If, on the other hand, the locking ring 16 is turned clockwise, that is, on the movement with which the top part 2 is to be joined to the bottom part 3, the tongues 24 become wedged on the annular face 15, with the result that further turning of the locking ring 16 is impeded.

The fact that the locking ring 16 can be rotated only one way ensures that the top part 2 can be mounted in a relatively trouble-free manner on the bottom part 3 in the manner of a bayonet joint. It is sufficient to insert the top part 2 into the bottom part 3 so that the radial projections 18 are introduced into the recesses 19. After a brief rotation of the top part 2 relative to the bottom part 3 in a clockwise direction the top part 2 and the bottom part 3 are fixedly connected, since the rotational movement of the locking ring is blocked by the tongues 24. Although it is possible to rotate the top part 2 relative to the bottom part 3 in the other direction, that is, in an anti-clockwise direction, this does not result directly in separation of the top part and bottom part, because the locking ring 16 rotates with the top part and the radial projections 18 are accordingly unable to engage the recesses 19.

In order nonetheless to be able to effect separation of the top part 2 and bottom part 3, slots 27 are provided in the wall 14. These slots break through the flanged edge 17 and the annular face 15 at least in certain regions. A tool 28, for example, the blade of a screwdriver, can be inserted through the slots. The tool then first of all meets the outer edge 29 of the locking ring 16. On further rotation of the locking ring 16, however, a radial cut 26 eventually coincides with the slot 27 so that the tool 28 is able to enter the radial cut 26. At the side of the radial cut 26 remote from the tongue 24 in the circumferential direction, a turning-moment engagement face 30, on which the tool 28 acts, is provided. Once the tool 28 has entered the radial cut 26, further rotational movement of the locking ring 16 in an anti-clockwise direction is prevented. When the top part 2 is then turned further, the radial projections 18 are able to continue sliding beneath the locking ring 16 and finally reach the recesses 19. At that moment it is possible to separate the top part 2 from the bottom part 3.

The embodiment illustrated can be modified in many respects. Thus, for example, the tongues 24 can also be bent upwards out of the plane of the locking ring 16. They then bear against the flanged edge 17. The radial projections 18 may alternatively project not outwards but inwards, if the recesses 19 in the locking ring 16 are provided in the outer edge thereof. The radial projections 18 can also be provided on the bottom part 3, if the locking ring 16 is arranged in the top part 2. In reality, it is relatively unimportant on which of the parts, top part 2 and bottom part 3, the corresponding fixing means are provided.

I claim:

1. In an operating device with a top part having an actuating arrangement for driving a control member, and a bottom part carrying the top part, wherein the top part and the bottom part are releasably connected with one another by means of a bayonet lock wherein essentially radial projections on one of the parts are held in the other part, the connection being effected by inserting the projections into recesses in the other part and turning the two parts in relation to each other, the improvement comprising the radial projections being essentially pimple-like projections, the recesses being formed in a resilient locking ring held in the other part, and the projections being formed to slide in beneath the locking ring when the top part and the bottom part are turned, the part carrying the radial projections comprising a beaker-shaped housing which continues in a sleeve-like foot of circular cross-section that carries the projections, the housing and the foot being of integral construction and being made of metal.

2. A device according to claim 1, in which the device is in the form of an electromagnetic valve with an armature that is movable in the top part, which armature projects into the bottom part.

3. A device according to claim 2, in which the armature is mounted in an armature tube that is fixed in a foot and projects into the bottom part.

4. In an operating device with a top part having an actuating arrangement for driving a control member, and a bottom part carrying the top part, wherein the top part and the bottom part are releasably connected with one another by means of a bayonet lock wherein essentially radial projections on one of the parts are held in the other part, the connection being effected by inserting the projections into recesses in the other part and turning the two parts in relation to each other, the improvement comprising the radial projections being essentially pimple-like projections, the recesses being formed in a resilient locking ring held in the other part, and the projections, being formed to slide in beneath the locking ring when the top part and the bottom part are turned and said locking ring is held in its part by a flanged edge.

5. A device according to claim 4, in which the locking ring is supported by an annular face on a side opposing the flanged edge.

6. A device according to claim 4, in which the recesses in the locking ring are substantially rectangular in shape, corners that form the transition from the recesses into an inner edge being bent in opposite directions out of the plane of the locking ring.

7. A device according to claim 4, in which the locking ring has formations projecting into the path of the radial projections.

8. The device according to claim 4, in which the locking ring is mounted so that it is rotatable at least in one direction and has an externally accessible turning-moment engagement face.

9. A device according to claim 4, in which the part carrying the radial projections comprises a beaker-shaped housing which continues in a sleeve-like foot of circular cross-section that carries the projections, the housing and the foot being of integral construction and being made of metal.

10. A device according to claim 4, in which the device is in the form of an electromagnetic valve with an armature that is movable in the top part, which armature projects into the bottom part.

11. In an operating device with a top part having an actuating arrangement for driving a control member, and a bottom part carrying the top part, wherein the top part and the bottom part are releasably connected with one another by means of a bayonet lock wherein essentially radial projections on one of the parts are held in the other part, the connection being effected by inserting the projections into recesses in the other part and turning the two parts in relation to each other, the improvement comprising the radial projections being essentially pimple-like projections, the recesses being formed in a resilient locking ring held in the other part, and the projections being formed to slide in beneath the locking ring when the top part and the bottom part are turned, the locking ring being mounted so that it is rotatable at least in one direction and having an externally accessible turning-moment engagement face.

12. A device according to claim 11, in which the locking ring has at least one radial opening and the part carrying the locking ring has at least one externally accessible slot with which the opening is caused to coincide.

13. A device according to claim 12, in which the slot interrupts the flanged edge and/or the annular face.

14. A device according to claim 12, in which several openings and several slots are provided, the number of openings and the number of slots having no common divisor greater than 1.

15. A device according to claim 11, in which the locking ring has a resilient tongue which on rotational movement of the locking ring in one direction wedges against the part carrying the locking ring and on rotational movement in the other direction slides along the part carrying the locking ring.

16. A device according to claim 15, in which the tongue is formed by a cut in the locking ring extending in a circumferential direction, at one end of which there adjoins a radial cut, a region circumscribed by the cuts being bent out of the plane of the locking ring.

* * * * *